United States Patent [19]
Shimazawa et al.

[11] Patent Number: 5,646,873
[45] Date of Patent: Jul. 8, 1997

[54] BARREL SHIFTER DEVICE AND VARIABLE-LENGTH DECODER

[75] Inventors: Takayoshi Shimazawa, Yokohama; Katsuhiro Seta, Inagi, both of Japan; Masataka Matsui, Menlo Park, Calif.

[73] Assignee: Kabushiki Kaisha Toshiba, Tokyo, Japan

[21] Appl. No.: 314,735

[22] Filed: Sep. 29, 1994

[30] Foreign Application Priority Data

Sep. 30, 1993 [JP] Japan ................................ 5-245380

[51] Int. Cl.$^6$ ............................................... G06F 7/00
[52] U.S. Cl. ............................................... 364/715.08
[58] Field of Search ........................................ 364/715.08

[56] References Cited

FOREIGN PATENT DOCUMENTS 4-128921  4/1992  Japan .

OTHER PUBLICATIONS

Ming–Ting Sun, et al., "A High–Speed Entropy Decoder For HDTV", IEEE 1992 Custom Integrated Circuits Conference, pp. 26.3.1–26.3.4.

Masataka Matsui, et al., "WP 4.6: 200MHz Video Compression Macrocells Using Low–Swing Differential Logic", 1994 IEEE International Solid–State Circuits Conference.

Primary Examiner—Tan V. Mai
Attorney, Agent, or Firm—Loeb & Loeb LLP

[57] ABSTRACT

A first and second barrel shifters (BSA0 and BSA1) are connected directly without intervening any pipe-line register between the two, and a sense amplifier (R3A0) is provided at an output side of the second barrel register (BSA1). Further, the circuit patterns of the first and second barrel shifters are formed being overlapped with each other in such a way that the elements of one of the first and second barrel shifters are formed at the dead space of the other of the two barrel shifters to reduce the pattern area. In the shift circuit and the variable-length decoder, the data lines of the barrel shifters can be minimized in size and width.

45 Claims, 6 Drawing Sheets

BARREL SHIFTER DEVICE AND VARIABLE-LENGTH DECODER

FIELD OF THE INVENTION

The present invention relates to a barrel shifter device and a variable-length decoder.

BACKGROUND OF THE INVENTION

In order to satisfy the quality of HDTV (high-definition television) level, the performance of 10 Mbps or more is required in an image contraction and expansion device. To realize this, it is necessary to decode data coded on the basis of the variable-length codes, for each clock. For doing this, it is necessary to automatically select heads of the continuous variable-length codes for each clock. The heads thereof can be selected by barrel shift on the basis of the code lengths of the variable-length codes.

FIG. 5 shows a conventional VLD (variable-length decoder). In the drawing, data are applied in unit of 32 bits from an FIFO (first-in first-out) memory 1 to a shift circuit 3 for VLD via an interface section 2. To the shift circuit 3, decode length information DLT is given from a look-up table via an accumulative adder 5. Therefore, the shift circuit 3 barrel-shifts (32 bit×2) data to select the heads in sequence and repeatedly. The interface section 2, the shift circuit 3 and the accumulative adder 5 constitute a head shifter section.

The operation of the VLD shown in FIG. 5 will be explained simply hereinbelow. Data of the external FIFO memory 1 are given to the interface section 2 in unit of 32 bits on the basis of a signal Read given by the accumulative adder 5. In the interface section 2, 32-bit data D0, D1, D2, . . . are stored in sequence in three registers R20, R21 and R22 on the basis of a signal Carry applied by the accumulative adder 5, and then updated in sequence in first-in and first-out manner. Further, data are inputted from the registers R20 and R21 to a first barrel shifter BS0 of the shift circuit 3. The first barrel shifter BS0 shifts 64-bit data from the registers R20 and R21 within a range from 0 to 31 bits on the basis of a shift length signal SH0 (the accumulatively added code length of the variable-length codes) of the accumulative adder 5, and then outputs the shifted data as 32-bit data. In other words, the first barrel shifter BS0 shifts the inputted data on the basis of a decode signal obtained by decoding the shift length signal SH0 through a decoder DC0. The shifted data are transmitted to a second barrel shifter BS1 via a register R31 as less significant bit side data. In the second barrel shifter BS1, the 32-bit more significant side data of the second barrel shifter BS1 are latched by a latch R30 and then applied to the same second barrel shifter BS1 as the preceding cycle data. The second barrel shifter BS1 shifts the inputted 64-bit data within the range from 0 to 31 bits on the basis of a shift length signal SH1 (a code length of the variable-length code decoded in the preceding cycle) applied by the accumulative adder 5, and outputs the shifted data as 32-bit data. In other words, the second barrel shifter BS1 shifts the inputted data on the basis of a decode signal obtained by decoding the shift length signal SH1 by a decoder DC1. The data of the second barrel shifter BS1 are given to the look-up table 4, form which the decode length information DLT is given to the second barrel shifter BS1 and the accumulative adder 5 via a register R50 as the signal SH1. An adder add of the accumulative adder 5 adds the contents of both the registers R50 and R51. The output of the adder add is given to the first barrel shifter BS0 as the signal SH0. When the output of the adder add exceeds "31", s signal carry is outputted. The outputted signal carry is given to the interface section 2 and further to the FIFO memory 1 as the signal Read via a resister R52, as already explained.

FIG. 6 shows a more practical circuit of the shift circuit 3, in which each data block is shown in unit of 4 bits for brevity (in FIG. 5, each data block is shown in unit of 32 bits). As understood in FIG. 6, the barrel shifter BS0 and BS1 are of the same configuration from the standpoint of hardware. That is, in the first barrel shifter BS0, a wiring area LA for data input lines dI(01) to dI(07) is positioned on the left side in FIG. 6, and an element area EA is positioned on the right side. In more detail, 16 element units (transistors) are arranged roughly into a matrix pattern in the element area EA. One end of each of these element units U arranged obliquely is connected to a data input line dI(0i) also arranged obliquely in correspondence to the obliquely-arranged element units in FIG. 6, and the other end of each of these element units U arranged in the column direction is connected to a bit line BL (i.e., a data output dout0(i)) arranged in the column direction in correspondence to the column-arranged element units. The gate of each of these element units U arranged in the row direction is connected to a select line SL(0i) arranged in the row direction in correspondence to the row-arranged element units U. Further, the other barrel shifter BS1 is constructed roughly in the same way as above. Therefore, when data are shifted 2 bits by the first barrel shifter BS0 on the basis of the shift signal SH0, the select line SL(02) is activated to turn on the element units U whose gates are connected thereto, so that the input data din00 can be shifted by 2 bits.

In the conventional device, as described above with reference to FIG. 5, registers R30 and R31 are interposed as pipe-line registers between the first and second barrel registers BS0 and BS1. In other words, since two registers are needed, the area occupied by the these registers increases. In addition, since the output dout0 of the first barrel register BS0 is applied to the second barrel register BS1 via the register R31, when 1-bit data is taken into account, it is impossible to use a single data line extending from the input of the first barrel register BS0 to the output of the second barrel register BS1. Therefore, it is practically impossible to adopt such a method that a single sense amplifier is connected to the output side of a single data line to reduce the width of the data lines.

In addition, as understood by FIG. 6, when each barrel shifter is seen, only wires (input data lines dI) are arranged coarsely on the left side wiring area LA under such conditions that there are many gaps and dead spaces (on which no wires are arranged). In summary, the area availability is low in the device.

SUMMARY OF THE INVENTION

With these problems in mind, therefore, it is the object of the present invention to provide a shift circuit and a variable-length decoder which can minimize the data line width of the barrel shifter and improve the area availability of the barrel shifter.

To achieve the above-mentioned object, the present invention provides a barrel shifter device for barrel-shifting plural-bit input data by a predetermined number of bits through a first barrel shifter and further barrel-shifting plural-bit output data of the first barrel shifter by a predetermined number of bits through a second barrel shifter, wherein: the first barrel shifter is constructed by forming a plurality of first switching elements into a matrix pattern in a first area corresponding to roughly a half area of an element forming area; by connecting one end of each of the first switching elements arranged obliquely to a first data input line also arranged obliquely in correspondence to the obliquely-arranged first switching elements; by connecting the other end of each of the first switching elements arranged in column direction to a first data line arranged in column direction in correspondence to the column-arranged first switching elements; and by connecting a control terminal of each of the first switching elements arranged in row direction to a first select line arranged in row direction in correspondence to the row-arranged first switching elements; the second barrel shifter is constructed by forming a plurality of second switching elements into a matrix pattern in a second area corresponding to a remaining half area of an element forming area; by connecting one end of each of the second switching elements arranged obliquely to a second data input line also arranged obliquely in correspondence to the obliquely-arranged second switching elements; by connecting the other end of each of the second switching elements arranged in column direction to a second data line arranged in column direction in correspondence to the column-arranged second switching elements; and by connecting a control terminal of each of the second switching elements arranged in row direction to a second select line arranged in row direction in correspondence to the row-arranged second switching elements; a part of the first data input lines connected to the switching elements formed in the first area is formed being extended to the first area through the second area; a part of the second data input lines connected to the switching elements formed in the second area is formed being extended to the second area through the first area; the first and second data input lines are formed being arranged alternately and roughly in parallel to each other; and an output end of each of the first data lines is connected to an input end of each of the corresponding second data input lines, respectively.

Further, the present invention provides a variable-length decoder having a head shifter circuit composed of an interface section, a shift circuit, and an accumulative adder section, wherein: said interface section is provided with an interface function for transmitting external plural-bit data to said shift circuit; a shift circuit includes a first barrel shifter, a second barrel shifter, and register; said first barrel shifter inputs the plural-bit input data from said interface section and further barrel-shifts the inputted data according to a first shift length data applied by said accumulative adder section; said second barrel shifter inputs the plural-bit data outputted by said first barrel shifter as less significant bit side data directly, without intervening any register, and further barrel-shifts data applied to itself in one-to-one correspondence to data outputted from itself according to a second shift length data applied from the outside as a specific data; and said register inputs more significant bit side plural-bit data outputted by said second barrel shifter and further outputs the latched data to said second barrel shifter as the more significant bit side data; and said accumulative adder section adds the second shift length data to an accumulative added value of the second shift length data obtained till a preceding cycle to form a first shift length data, and applies the formed first length data to the first barrel shifter.

In the shift circuit according to the present invention, the first and second barrel shifters are formed being overlapped with each other on a plane to reduce the device size. In other words, the first barrel shifter elements are formed on a dead space of the area in which the second barrel shifter element are formed, and the second barrel shifter elements are formed on a dead space of the area in which the first barrel shifter element are formed. Since the first and second barrel shifters are formed being overlapped conditions with respect to each other, the device size can be minimized.

In the variable-length decoder according to the present invention, the output end of the first barrel shifter is connected directly to the input end of the second barrel shifter without intervening any register between the two barrel shifters. Therefore, it is possible to connect the data input end of the first barrel shifter to the data output end of the second barrel shifter through only a single line. Therefore, when a circuit provided with an amplifying function is connected to the output end of the second barrel shifter, it is possible to reduce the data line width. Further, the output of the second barrel shifter is applied to the input side thereof via a register provided at the output side of the second barrel shifter, without providing any register at the input side of the second barrel register or at an intermediate portion between the first and second barrel shifters. Therefore, it is possible to form the first and second barrel shifters in the formation including no register.

DETAILED DESCRIPTION OF THE EMBODIMENTS

An embodiment of the shift circuit and the variable-length decoder according to the present invention will be described hereinbelow with reference to the attached drawings.

Figure 1:
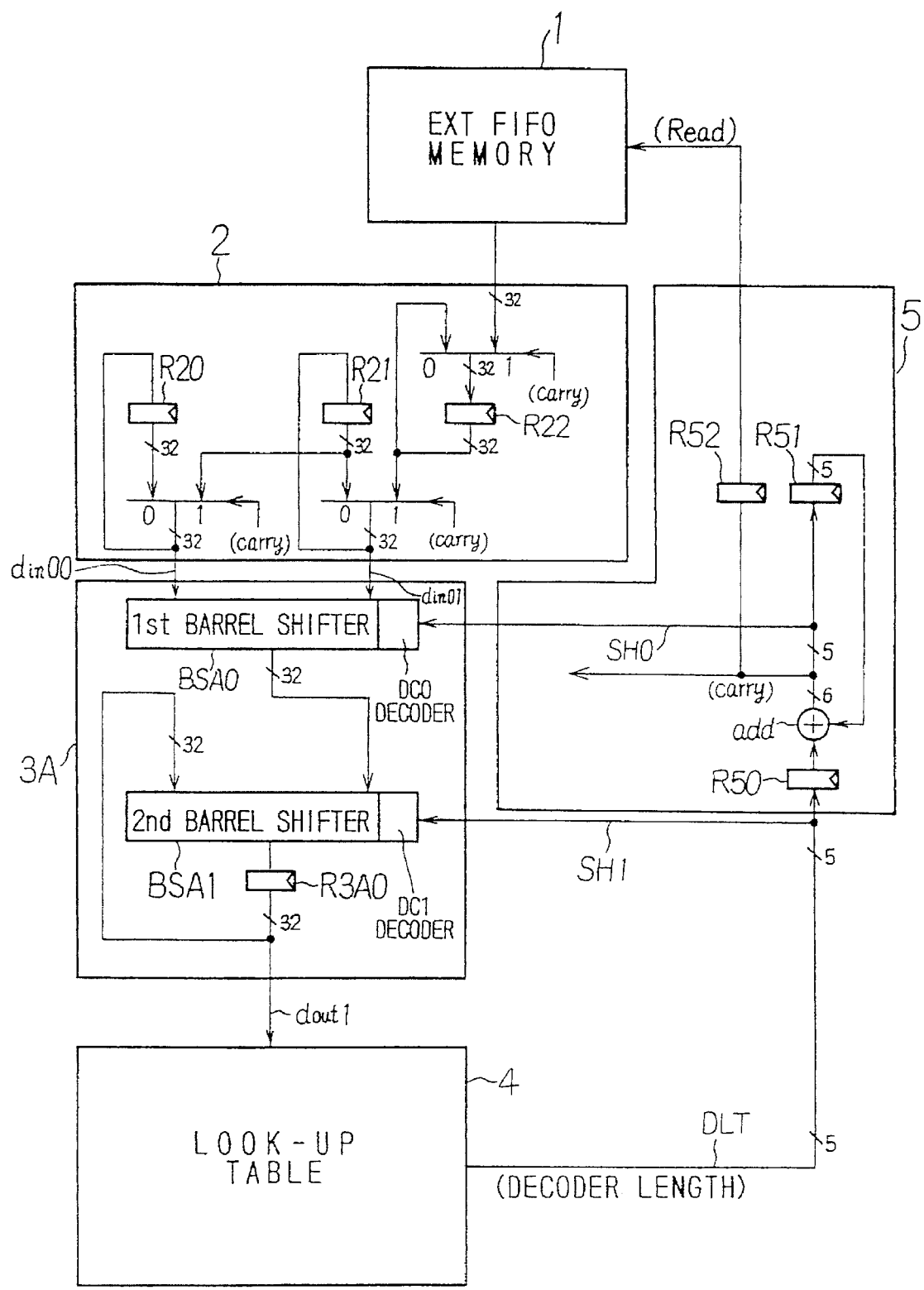
FIG. 1 is an entire block diagram showing an embodiment (32-bit configuration) variable-length decoder according to the present invention.
Figure 5:
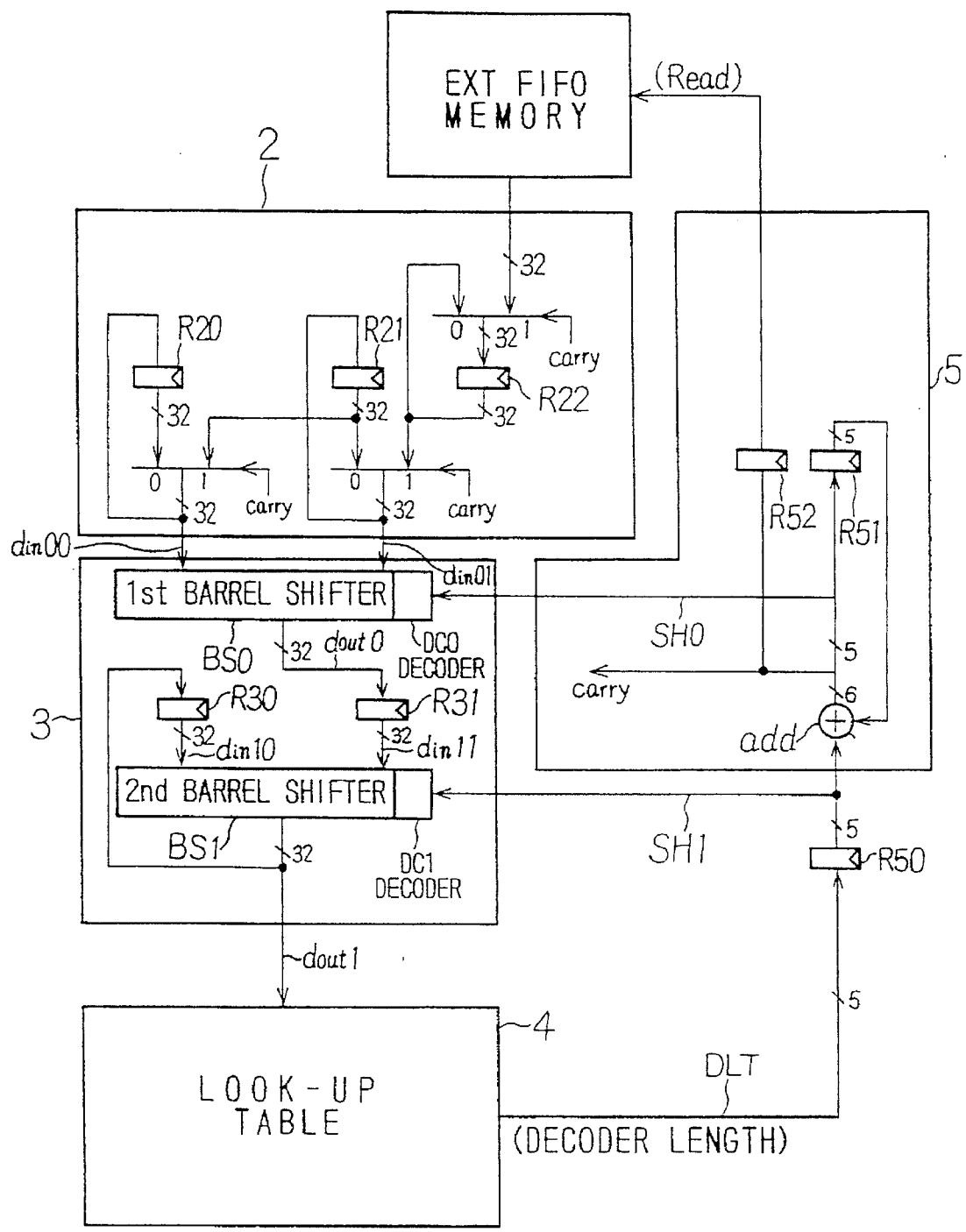
FIG. 5 is an entire block diagram showing a conventional (32-bit configuration) variable-length decoder.

FIG. 1 is an entire block diagram showing an embodiment of the present invention. The variable-length decoder shown in FIG. 1 is different from the conventional variable-length decoder shown in FIG. 5 in only the shift circuit 3A, and the other remaining sections are almost the same as that shown in FIG. 5. Therefore, the same reference numerals have been retained for similar circuit elements which have the same functions as with the case of that shown in FIG. 5, without repeating any detailed description thereof.

In the shift circuit 3A shown in FIG. 1, only a single register (a flip-flop F/F including a sense amplifier S/A) R3A0 is connected to the output side of the second barrel register BSA1, without providing any pipe-line registers between the first and second barrel registers BSA0 and BSA1. Therefore, it is possible to reduce the number of the registers by half. In other words, the output of the first barrel register BSA0 is directly applied to the second barrel register BSA1 without passing through any register. Therefore, when a single bit data is taken into account, it is possible to use only a single data line from the input side of the first barrel register BSA0 to the output side of the second barrel register BSA1. Further, since the flip-flop F/F using the sense amplifier S/A is adopted as the register R3A0, it is possible to reduce the width of the data lines. The output of the second barrel shifter BSA1 is given to the input side of the second barrel shifter BSA1 via a latch R3A0. In other words, the output of the second barrel shifter BSA1 of the preceding cycle is given to the same second barrel shifter BSA1 as more significant bit side data. Further, the output of the first barrel shifter BSA0 is given to the second barrel shifter BSA1 as less significant bit side data. As understood above, the interface section 2 and the shift circuit 3A are of register-in register-out configuration, so that it is possible to markedly improve the practical way to use.

Further, in FIG. 1, the first and second barrel shifters BSA0 and BSA1 are shows as if they are formed at two different areas. In practice, however, these two barrel shifters BSA0 and BSA1 are formed under overlapped condition. This overlapped formation of the two barrel shifters will be described hereinbelow with reference to FIGS. 2 and after.

Figure 2:
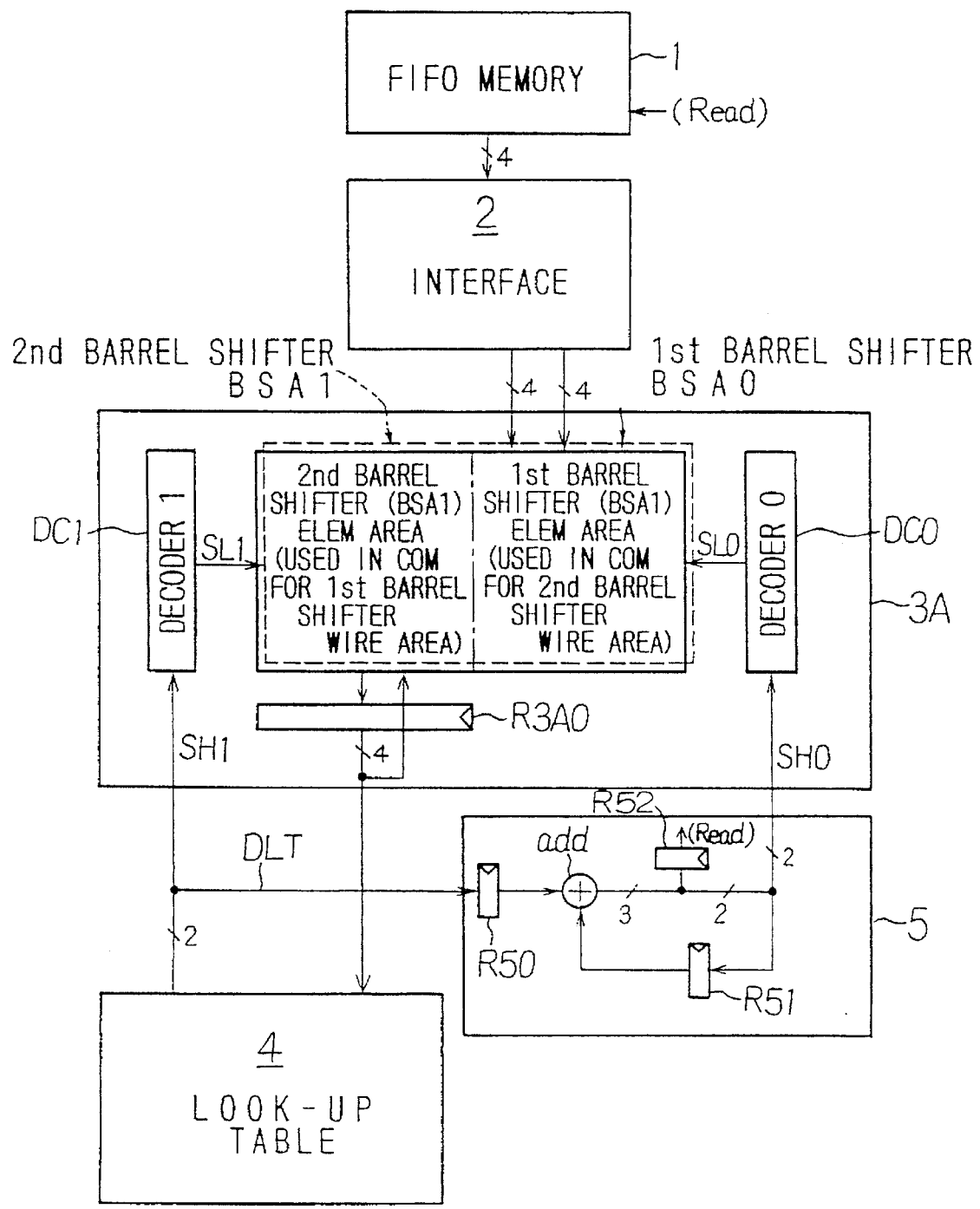
FIG. 2 is an entire block diagram showing another embodiment (4-bit configuration) of the variable-length decoder (a head shifter) according to the present invention, in which the positional arrangement relationship between first and second barrel shifters is particularly shown.
Figure 3:
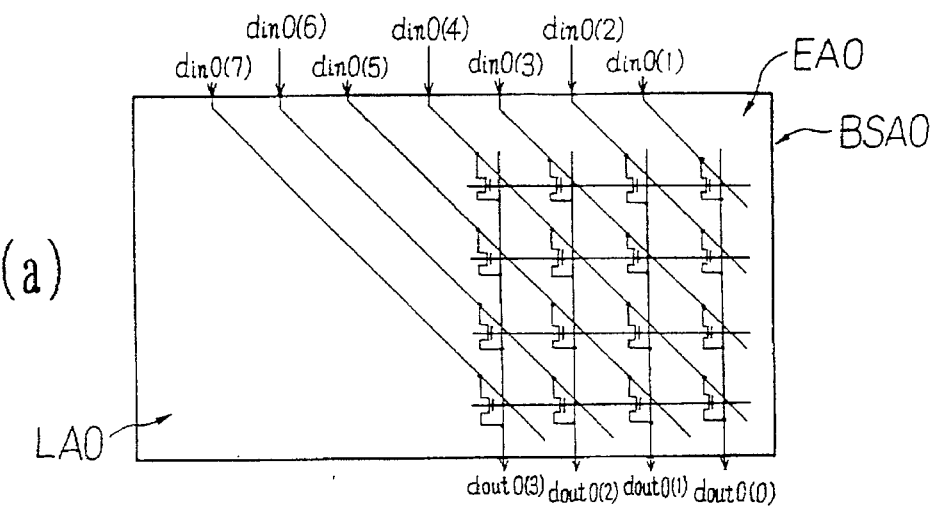
FIGS. 3(a) to 3(c) are illustrations showing a detailed arrangement of the cell units of first and second barrel shifters (as a head shifter) of the variable-length decoder shown in FIG. 2, for assistance in explaining the principle thereof.
Figure 3:
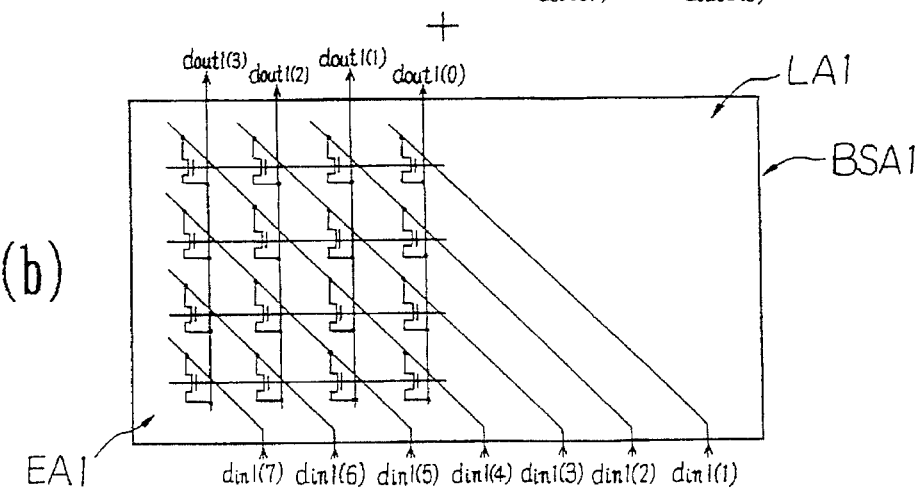
Figure 3:
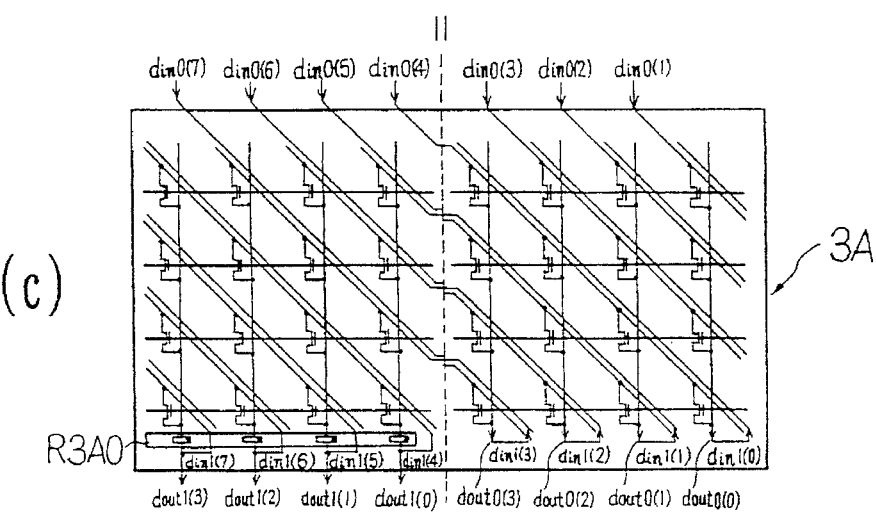
Figure 6:
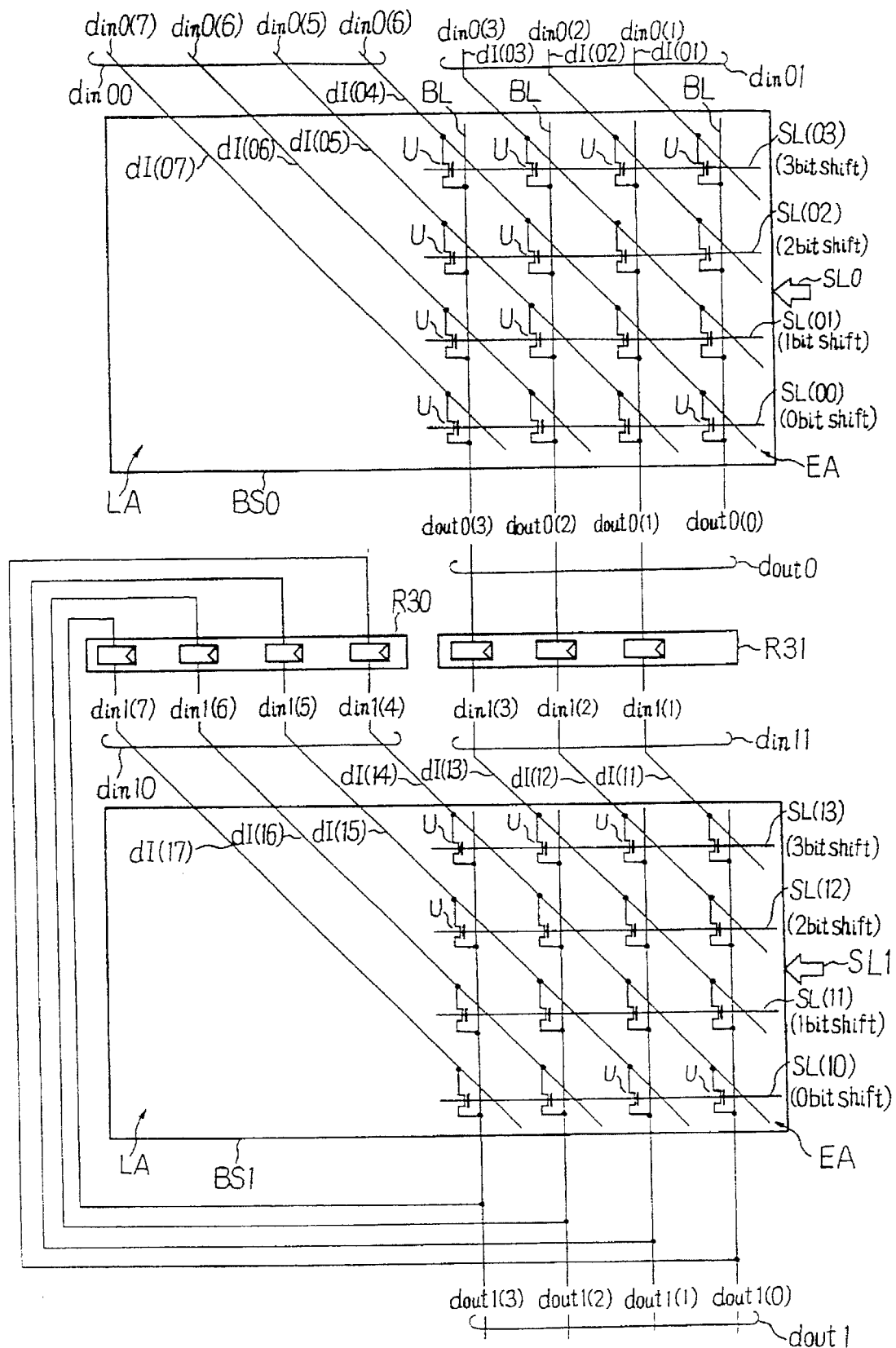
FIG. 6 is an illustration showing a detailed arrangement of the cell units of the conventional first and second barrel shifters shown in FIG. 5.

FIG. 1 shows the variable-length decoder for reading 32-bit data from the external FIFO memory 1. On the other hand, FIG. 2 shows the same decoder for reading 4-bit data from the external FIFO memory 1, for only brevity. As shown in FIG. 2, elements of the second barrel shifter BSA1 are formed in the wiring area of the first barrel shifter BSA0, and elements of the first barrel shifter BSA0 are formed in the wiring area of the second barrel shifter BSA1. The shift circuit 3A shown in FIG. 2 is shown in FIG. 3(c) in more practical way. In FIG. 3(c), the shift circuit 3A is formed by overlapping the first barrel shifter BSA0 shown in FIG. 3(a) and the second barrel shifter BSA1 shown in FIG. 3(b) on a plane. Further, the second barrel shifter BSA1 shown in FIG. 3(b) is shown by turning the second barrel shifter BS1 shown in FIG. 6 upside down. When the first and second barrel shifters BSA0 and BSA1 are overlapped with respect to each other, it is possible to use the wiring area (including the dead space) of the first barrel shifter BSA0 effectively as the element area EA1 of the second barrel shifter BSA1 and in the same way to use the wiring area (including the dead space) of the second barrel shifter BSA1 effectively as the element area EA0 of the first barrel shifter BSA0. In other words, since the area can be used effectively, it is possible to reduce the areas of the first and second barrel shifters BSA0 and BAS1 roughly by half of the area of the shift circuit 3A, respectively, as well understood in comparison with FIGS. 3(a), (b) and (c).

The shift operation of the shift circuit 3A shown in FIG. 3(c) will be explained with reference to FIG. 4 by way of example. Here, the assumption is made that 2 bits and 1 bit are shifted by the first and second barrel registers BSA0 and BSA1, respectively. In this case, in the first barrel register BSA0, the select line SL(02) for two-bit shift is activated to turn on the cell units U14 to U17. Further, in the second barrel register BSA1, the select line SL(11) for one-bit shift is activated to turn on the cell units U20 to U23. Under these conditions, the input data din0(5) applied to the input data line dI(5), for instance is transmitted to the data line BL(03) as the output dout0(3) (because the unit U14 is turned on) as indicated by thick lines in FIG. 4, so that two bits can be shifted. The output data dout0(3) of the first barrel shifter BSA0 is transmitted to the input data line dI(13) as the input data din1(3) to the second barrel shifter BSA1, without being outputted to the outside. Since the unit U23 is turned on, the input data din1(3) is transmitted to the data line BL(10), and then outputted as the output dout1(0) via a latch B3A00, also as indicated by thick lines in FIG. 4. The data of the latch B3A00 is transmitted to the data input line dI(04) in the succeeding cycle.

Figure 4:
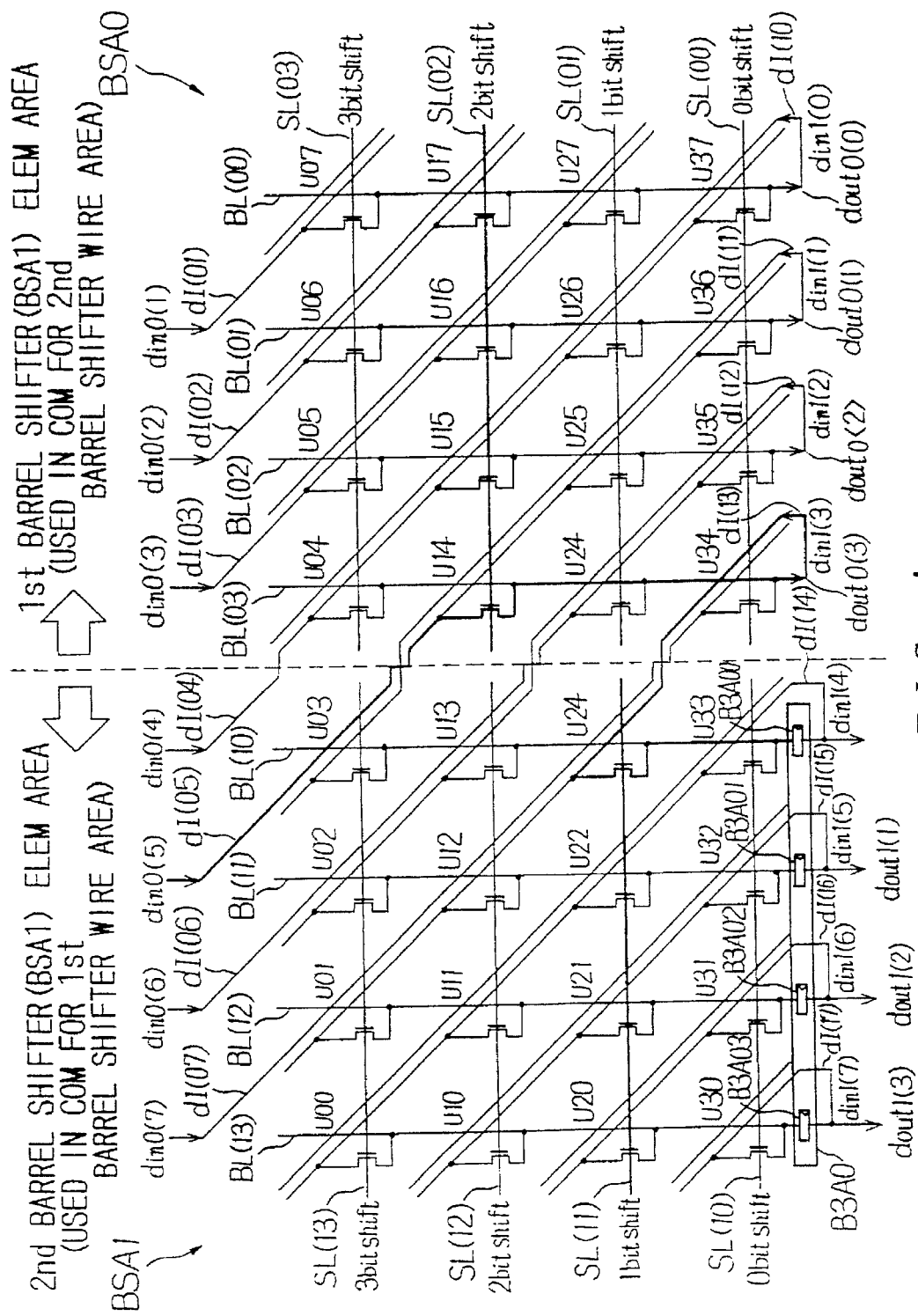
FIG. 4 is an enlarged view for assistance in explaining the shift operation of the shift circuit shown in FIG. 3(a) to 3(c)

As shown in FIG. 4, the input side of the first barrel shifter BSA0 can be connected to the output side of the second barrel shifter BSA1 by a single line. Therefore, when the select lines SL(02) and SL(11) are activated, for instance as described above, it is possible to connect the data input line dI(05) to the data line BL(10), by a single line, by way of the data input line dI(05), the unit U14, the data line BL(03), the data input line dI(13), the unit U23, and the data line BL(10). Accordingly, when the flip-flop F/F having the sense amplifier S/A is used as the register B3A00, it is possible to minimize the width of a single wire.

In the variable-length decoder according to the present invention, since the first and second barrel registers are formed being overlapped with respect to each other on a plane, the space of the shift circuit can be utilized effectively and thus the size of the shift circuit can be minimized. In addition, since the first and second barrel shifters are connected directly without intervening any pipe-line registers between both, it is possible to connect the input end of the first barrel shifter to the output end of the second barrel shifter by a single wire for each bit, so that the wiring area can be saved. Further, when the amplifying means is provided on the output side of the data line, the data line width can be minimized.

What is claimed is:

1. A barrel shifter device for barrel-shifting plural-bit input data by a predetermined number of bits, the barrel shifter device comprising:

a first barrel shifter having a plurality of first switching elements in a matrix pattern in a first area corresponding to roughly a half area of an element forming area, a first end of each of the first switching elements being arranged obliquely and coupled to a first data input line, the first input data input line being arranged obliquely in correspondence to the obliquely-arranged first switching elements, an obliquely upward end of each of the first data input lines being a data input end so that data is transmitted from an obliquely upward end to an obliquely downward end, a second end of each of the first switching elements being arranged in column direction and coupled to a first data line arranged in column direction in correspondence to the column-arranged first switching elements, each of the first switching elements arranged in row direction having a control terminal coupled to a first select line arranged in row direction in correspondence to the row-arranged first switching elements; and a second barrel shifter having a plurality of second switching elements in a matrix pattern in a second area corresponding to a remaining half area of the element forming area a first end of each of the second switching elements being arranged obliquely and coupled to a second data input line, the second input line being arranged obliquely in correspondence to the obliquely-arranged second switching elements, a second end of each of the second switching elements being arranged in column direction and coupled to a second data line arranged in column direction in correspondence to the column-arranged second switching elements, an obliquely downward end of each of the second data input lines being a data input end so that data is transmitted from an obliquely downward end to an obliquely upward end, each of the second switching elements arranged in row direction having a control terminal coupled to a second select line arranged in row direction in correspondence to the row-arranged second switching elements, wherein a part of the first data input lines coupled to the switching elements formed in the first area is extended to the first area through the second area;

a part of the second data input lines coupled to the switching elements formed in the second area is extended to the second area through the first area;

the first and second data input lines are arranged alternately and roughly in parallel to each other; and an output end of each of the first data lines is coupled directly to an input end of each of the corresponding second data input lines, respectively independent of any intervening register.

2. The shift circuit of claim 1, wherein a register is connected to an output side of each of the second data lines.

3. The shift circuit of claim 2, wherein the register is provided with an amplifying function.

4. The shift circuit of claim 3, wherein an output end of the register is coupled to an input end of each of the second data input lines, respectively.

5. The shift circuit of claim 2, wherein an output end of the register is coupled to an input end of each of the second data input lines, respectively.

6. A variable-length decoder having a head shifter circuit, the decoder comprising:

an interface section for transmitting external plural-bit data;

a shift circuit including:

an accumulative adder section for providing a first shift length data signal and a second shift length data signal;

a first barrel shifter for receiving the plural-bit input data from said interface section and the inputted data according to the first shift length data signal applied by said accumulative adder section;

a second barrel shifter for receiving shifted plural-bit data outputted by said first barrel shifter as least significant bits directly and independent of any intervening register, and for barrel-shifting data applied to the second barrel-shifter in one-to-one correspondence to data outputted from the second barrel-shifter according to the second shift length data signal; and a register for receiving most significant bits of the output of said second barrel shifter and for outputting the latched data to said second barrel shifter as the more significant bit side data, wherein said accumulative adder section adds the second shift length data to an accumulative added value of the second shift length data obtained from a preceding cycle to provide the first shift length data signals and the second shift length data signals, wherein:

the first barrel shifter includes a plurality of first switching elements in a matrix pattern in a first area corresponding to roughly a half area of an element forming area, a first end of each of the first switching elements being arranged obliquely and coupled to a first data input line, the first input data input line being arranged obliquely in correspondence to the obliquely-arranged first switching elements, an obliquely upward end of each of the first data input lines being a data input end so that data is transmitted from an obliquely upward end to an obliquely downward end, a second end of each of the first switching elements being arranged in column direction and coupled to a first data line arranged in column direction in correspondence to the column-arranged first switching elements, each of the first switching elements arranged in row direction having a control terminal coupled to a first select line arranged in row direction in correspondence to the row-arranged first switching elements;

the second barrel shifter includes a plurality of second switching elements in a matrix pattern in a second area corresponding to a remaining half area of an element forming area a first end of each of the second switching elements being arranged obliquely to a second data input line, the second input line being arranged obliquely in correspondence to the obliquely-arranged second switching elements, a second end of each of the second switching elements being arranged in column direction and coupled to a second data line arranged in column direction in correspondence to the column-arranged second switching elements, an obliquely downward end of each of the second data input lines being a data input end so that data is transmitted from an obliquely downward end to an obliquely upward end, each of the second switching elements arranged in row direction having a control terminal coupled to a second select line arranged in row direction in correspondence to the row-arranged second switching elements;

a part of the first data input lines coupled to the switching elements formed in the first area is extended to the first area through the second area;

a part of the second data input lines coupled to the switching elements formed in the second area is extended to the second area through the first area;

the first and second data input lines are arranged alternately and roughly in parallel to each other;

an output end of each of the first data lines is coupled directly to an input end of each of the corresponding second data input lines, respectively, independent of any intervening register; and an output end of each of the second data lines is coupled to an input end of each of the corresponding second data input line, respectively.

7. The variable-length decoder of claim 6, the variable length decoder further comprising a look-up table for providing the second shift length data signal based upon output data inputted to said look-up table.

8. The variable-length decoder of claim 7, wherein said first barrel shifter is formed in an element area, said second barrel shifter is formed on an area in which said first barrel shifter is formed, and said first and second barrel shifters partially overlap in the element area.

9. The variable-length decoder of claim 8, wherein:

the first barrel shifter includes a plurality of first switching elements in a matrix pattern in a first area corresponding to roughly a half area of an element forming area, a first end of each of the first switching elements being arranged obliquely and coupled to a first data input line also arranged obliquely in correspondence to the obliquely-arranged first switching elements, an obliquely upward end of each of the first data input lines being a data input end so that data is transmitted from an obliquely upward end to an obliquely downward end, each of the first switching elements arranged in column direction having a control terminal coupled to a first data line arranged in column direction in correspondence to the column-arranged first switching elements each of the first switching elements arranged in row direction having a control terminal coupled to a first select line arranged in row direction in correspondence to the row-arranged first switching elements;

the second barrel shifter includes a plurality of second switching elements in a matrix pattern in a second area corresponding to a remaining half area of an element forming area, a first end of each of the second switching elements being arranged obliquely to a second data input line, the second input line being arranged obliquely in correspondence to the obliquely-arranged second switching elements, a second end of each of the second switching elements being arranged in column direction and coupled to a second data line arranged in column direction in correspondence to the column-arranged second switching elements, an obliquely downward end of each of the second data input lines being a data input end so that data is transmitted from an obliquely downward end to an obliquely upward end, each of the second switching elements arranged in row direction having a control terminal coupled to a second select line arranged in row direction in correspondence to the row-arranged second switching elements;

a part of the first data input lines coupled to the switching elements formed in the first area is extended to the first area through the second area;

a part of the second data input lines coupled to the switching elements formed in the second area is extended to the second area through the first area;

the first and second data input lines are arranged alternately and roughly in parallel to each other;

an output end of each of the first data lines is coupled directly to an input end of each of the corresponding second data input lines, respectively, independent of any intervening register; and an output end of each of the second data lines is coupled to an input end of each of the corresponding second data input lines, respectively.

10. The variable-length decoder of claim 7, wherein a part of wiring of said first barrel shifter is formed in an element forming area of said second barrel shifter, and a part of wiring of said second barrel shifter is formed in an element forming area of said first barrel shifter.

11. The variable-length decoder of claim 7, wherein:

the first barrel shifter includes a plurality of first switching elements in a matrix pattern in a first area corresponding to roughly a half area of an element forming area, a first end of each of the first switching elements being arranged obliquely and coupled to a first data input line also arranged obliquely in correspondence to the obliquely-arranged first switching elements, an obliquely upward end of each of the first data input lines being a data input end so that data is transmitted from an obliquely upward end to an obliquely downward end, each of the first switching elements arranged in column direction having a control terminal coupled to a first data line arranged in column direction in correspondence to the column-arranged first switching elements each of the first switching elements arranged in row direction having a control terminal coupled to a first select line arranged in row direction in correspondence to the row-arranged first switching elements;

the second barrel shifter includes a plurality of second switching elements in a matrix pattern in a second area corresponding to a remaining half area of the element forming area, a first end of each of the second switching elements being arranged obliquely to a second data input line, the second input line being arranged obliquely in correspondence to the obliquely-arranged second switching elements, a second end of each of the second switching elements being arranged in column direction and coupled to a second data line arranged in column direction in correspondence to the column-arranged second switching elements, an obliquely downward end of each of the second data input lines being a data input end so that data is transmitted from an obliquely downward end to an obliquely upward end, each of the second switching elements arranged in row direction having a control terminal coupled to a second select line arranged in row direction in correspondence to the row-arranged second switching elements;

a part of the first data input lines coupled to the switching elements formed in the first area is extended to the first area through the second area;

a part of the second data input lines coupled to the switching elements formed in the second area is extended to the second area through the first area;

the first and second data input lines are arranged alternately and roughly in parallel to each other;

an output end of each of the first data lines is coupled directly to an input end of each of the corresponding second data input lines, respectively, independent of any intervening register; and an output end of each of the second data lines is coupled to an input end of each of the corresponding second data input lines, respectively.

12. The variable-length decoder of claim 6, wherein said first barrel shifter is formed in an element area, said second barrel shifter is formed on an area in which said first barrel shifter is formed, and said first and second barrel shifters partially overlap in the element area.

13. The variable-length decoder of claim 12, wherein a part of wiring of said first barrel shifter is formed in an element forming area of said second barrel shifter, and a part of wiring of said second barrel shifter is formed in an element forming area of said first barrel shifter.

14. The variable-length decoder of claim 12, wherein:

the first barrel shifter includes a plurality of first switching elements in a matrix pattern in a first area corresponding to roughly a half area of an element forming area, a first end of each of the first switching elements being arranged obliquely and coupled to a first data input line also arranged obliquely in correspondence to the obliquely-arranged first switching elements, an obliquely upward end of each of the first data input lines being a data input end so that data is transmitted from an obliquely upward end to an obliquely downward end, each of the first switching elements arranged in column direction having a control terminal coupled to a first data line arranged in column direction in correspondence to the column-arranged first switching elements, each of the first switching elements arranged in row direction having a control terminal coupled to a first select line arranged in row direction in correspondence to the row-arranged first switching elements;

the second barrel shifter includes a plurality of second switching elements in a matrix pattern in a second area corresponding to a remaining half area of the element forming area, a first end of each of the second switching elements being arranged obliquely to a second data input line, the second input line being arranged obliquely in correspondence to the obliquely-arranged second switching elements, a second end of each of the second switching elements being arranged in column direction and coupled to a second data line arranged in column direction in correspondence to the column-arranged second switching elements, an obliquely downward end of each of the second data input lines being a data input end so that data is transmitted from an obliquely downward end to an obliquely upward end, each of the second switching elements arranged in row direction having a control terminal coupled to a second select line arranged in row direction in correspondence to the row-arranged second switching elements;

a part of the first data input lines coupled to the switching elements formed in the first area is extended to the first area through the second area;

a part of the second data input lines coupled to the switching elements formed in the second area is extended to the second area through the first area;

the first and second data input lines are arranged alternately and roughly in parallel to each other;

an output end of each of the first data lines is coupled directly to an input end of each of the corresponding second data input lines, respectively, independent of any intervening register; and an output end of each of the second data lines is coupled to an input end of each of the corresponding second data input lines, respectively.

15. The variable-length decoder of claim 6, wherein a part of wiring of said first barrel shifter is formed in an element forming area of said second barrel shifter, and a part of wiring of said second barrel shifter is formed in an element forming area of said first barrel shifter.

16. The variable-length decoder of claim 6, wherein a register is coupled to an output side of each of said second data lines.

17. The variable-length decoder of claim 16, wherein the register is provided with an amplifying function.

18. The variable-length decoder of claim 6, wherein:
said first barrel shifter includes a plurality of first switching elements arranged at substantially a first half area of an element forming area thereof roughly into a matrix pattern; and
said second barrel shifter includes a plurality of second switching elements arranged at substantially a second half area of the element forming area thereof roughly into a matrix pattern.

19. The variable-length decoder of claim 18, wherein a plurality of first data input lines for supplying input data to said first barrel shifter and a plurality of second data input lines for supplying output data to said second barrel shifter are both formed in spaces between the first and second switching elements arranged at the first and second areas, respectively.

20. The variable-length decoder of claim 19, wherein the first and second data input lines are arranged alternately and formed in parallel to each other.

21. The variable-length decoder of claim 19, wherein:
a part of the first data input lines coupled to the switching elements arranged at the first area pass through the second area and reach the first area; and a part of the second data input lines coupled to the switching elements arranged at the second area pass through the first area and reach the second area.

22. The variable-length decoder of claim 21, wherein:
respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged in the row direction; and respective first input terminals of the second switching elements are arranged obliquely in the element forming area and coupled to corresponding second data input lines being arranged obliquely, an obliquely downward end of each of the second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

23. The variable-length decoder of claim 20, wherein:
a part of the first data input lines coupled to the switching elements arranged at the first area pass through the second area and reach the first area; and a part of the second data input lines coupled to the switching elements arranged at the second area pass through the first area and reach the second area.

24. The variable-length decoder of claim 23, wherein:
respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged in the row direction; and respective first input terminals of the second switching elements are arranged obliquely in the element forming area and coupled to corresponding second data input lines arranged obliquely, an obliquely downward end of each of the second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

25. The variable-length decoder of claim 20, wherein:

respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged in the row direction; and respective first input terminals of the second switching elements are arranged obliquely in the element forming area and coupled corresponding second data input lines being arranged obliquely, an obliquely downward end of each of the second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

26. The variable-length decoder of claim 19, wherein:

respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged in the row direction; and respective first input terminals of the second switching elements are arranged obliquely in the element forming area and coupled to corresponding second data input lines being arranged obliquely, an obliquely downward end of each of second data input lines being a data input end so that data is transmitted from an obliquely downward end to an obliquely upward end; respective second input terminals of the second switching elements are arranged in column direction in the element forming area and coupled to corresponding second data lines are being arranged in the column direction; and respective control terminals of the second switching elements are arranged in row direction in the element forming area and coupled to corresponding second select input lines being arranged in row direction.

27. A barrel shifter device, comprising:

a first barrel shifter for barrel-shifting input data of a plurality of bits by a predetermined number of bits, said first barrel shifter having a plurality of output terminals corresponding to respective bits and a plurality of first barrel-shifting switch elements arranged at substantially a first half area of an element forming area thereof roughly into a matrix pattern; and a second barrel shifter for further barrel-shifting data of a plurality of bits outputted by said first barrel shifter by an additional predetermined number of bits, said second barrel shifter having a plurality of output terminals corresponding to respective bits and a plurality of second barrel-shifting switch elements arranged at substantially a second half area of the element forming area thereof roughly into a matrix pattern, wherein the output terminals of respective bits of said first barrel shifter are directly coupled to the input terminals of respective corresponding bits of said second barrel shifter independent of any intervening register, wherein a plurality of first data input lines for supplying the input data to said first barrel shifter and a plurality of second data input lines for supplying the output data to said second barrel shifter are both formed in spaces between the first and second switching elements arranged at the first and second areas, respectively, wherein respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged in the row direction; and respective first input terminals of the second switching elements are arranged obliquely in the element forming area and coupled to corresponding second data input lines being arranged obliquely, an obliquely downward end of each of the second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

28. The barrel shifter device of claim 27, wherein the first and second data input lines are arranged alternately and formed in parallel to each other.

29. The barrel shifter device of claim 28, wherein:

a part of the first data input lines coupled to the switching elements arranged at the first area pass through the second area and reach the first area; and a part of the second data input lines coupled to the switching elements arranged at the second area pass through the first area and reach the second area.

30. The barrel shifter device of claim 29, wherein:

respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged in the row direction; and respective first input terminals of the second switching elements are arranged obliquely in the element forming area and coupled to corresponding second data input lines being arranged obliquely, an obliquely downward end of each of the second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

31. The barrel shifter device of claim 30, wherein registers are coupled to output sides of the second data lines, respectively.

32. The barrel shifter device of claim 31, wherein the registers are each provided with an amplification function.

33. The barrel shifter device of claim 31, wherein output terminals of the registers are coupled to input terminals of corresponding second data input lines, respectively.

34. The barrel shifter device of claim 28, wherein:

respective first output terminals of the first switching elements are arranged obliquely in the element forming area and coupled to corresponding first data input lines arranged obliquely, an obliquely upward end of each of the first data input lines lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area coupled to corresponding first data select lines being arranged in the row direction; and respective first input terminals of second switching elements are arranged obliquely in the element forming area and coupled to corresponding second data input lines being arranged obliquely, an obliquely downward end of each of second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

35. The barrel shifter device of claim 34, wherein registers are coupled to output sides of the second data lines, respectively.

36. The barrel shifter device of claim 35, wherein the register are each provided with an amplification function.

37. The barrel shifter device of claim 35, wherein output terminals of the registers are coupled to input terminals of corresponding second data input lines, respectively.

38. The barrel shifter device of claim 27, wherein:

a part of the first data input lines coupled to the switching elements arranged at the first area pass through the second area and reach the first area; and a part of the second data input lines coupled to the switching elements arranged at the second area pass through the first area and reach the second area.

39. The barrel shifter device of claim 38, wherein:

respective first output terminals of the first switching elements are arranged obliquely in the element forming area and coupled to corresponding first data input lines arranged obliquely, an obliquely upward end of each of the first data input lines being a data input end so that data is transmitted from an obliquely upward end to an obliquely downward end; respective second output terminals of the first switching elements are arranged in column direction in the element forming area and coupled to corresponding first data lines being arranged in the column direction; respective control terminals of the first switching elements are arranged in row direction in the element forming area and coupled to corresponding first data select lines being arranged also in the row direction; and respective first input terminals of the second switching elements are arranged obliquely in the element forming area and coupled to corresponding second data input lines being arranged obliquely, an obliquely downward end of each of the second data input lines being a data input end so that data is transmitted from an obliquely downward end to an obliquely upward end; respective second input terminals of the second switching elements are arranged in column direction in the element forming area and coupled to corresponding second data lines being arranged in the column direction; and respective control terminals of the second switching elements are arranged in row direction in the element forming area and coupled to corresponding second select input lines being arranged in the row direction.

40. The barrel shifter device of claim 39, wherein registers are coupled to output sides of the second data lines, respectively.

41. The barrel shifter device of claim 40, wherein the registers are each provided with an amplification function.

42. The barrel shifter device of claim 40, wherein output terminals of the registers are coupled to input terminals of corresponding second data input lines, respectively.

43. The barrel shifter device of claim 27, wherein registers are coupled to output sides of the data lines, respectively.

44. The barrel shifter device of claim 43, wherein the registers are each provided with an amplification function.

45. The barrel shifter device of claim 43, wherein output terminals of the registers are coupled to input terminals of corresponding second data input lines, respectively.

* * * * *